F. E. DAVIS.
BRAKE AND CLUTCH MECHANISM.
APPLICATION FILED MAY 19, 1916.
1,227,758.
Patented May 29, 1917.
2 SHEETS—SHEET 1.
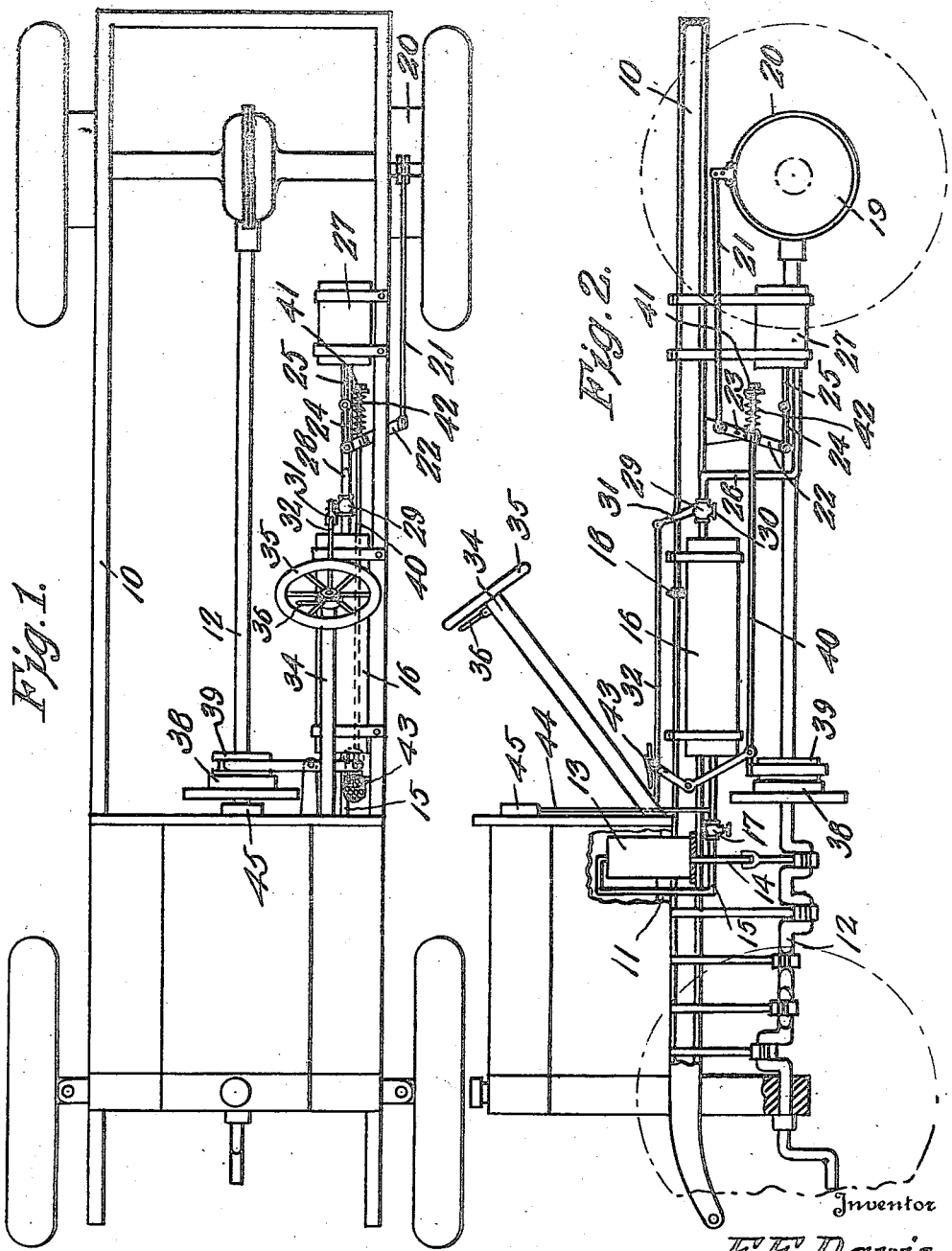
Witnesses
James F. Brown,
L. N. Gillis.
Inventor
F. E. Davis,
By 
Attorneys F. E. DAVIS.
BRAKE AND CLUTCH MECHANISM.
APPLICATION FILED MAY 19, 1916.
1,227,758.
Patented May 29, 1917.
2 SHEETS—SHEET 2.
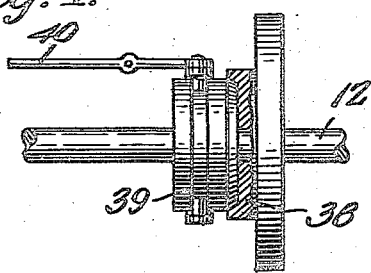
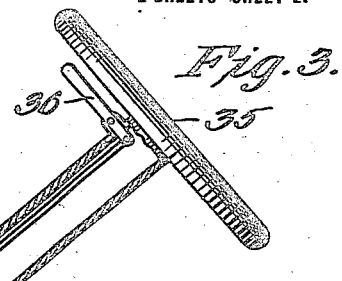
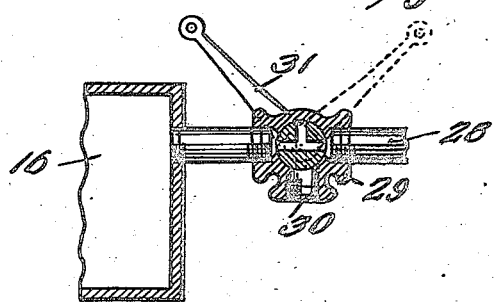
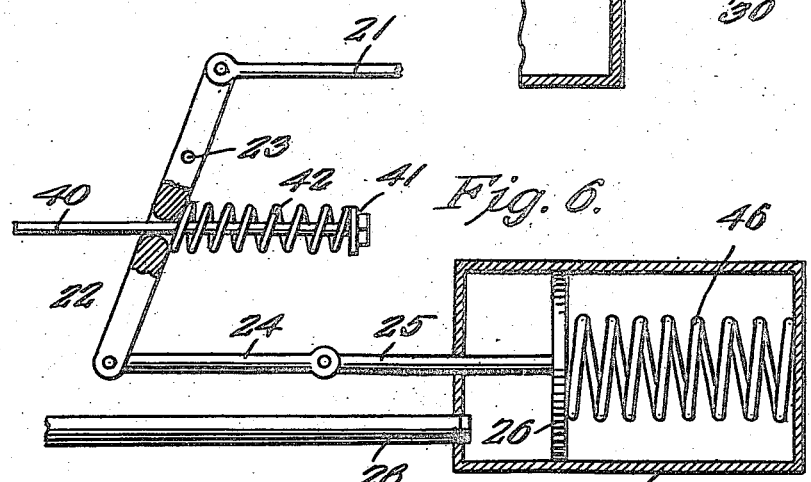
Inventor
F. E. Davis,
Witnesses
By
Attorneys

UNITED STATES PATENT OFFICE.

FORREST ELLIOTT DAVIS, OF WHITINGHAM, VERMONT.

BRAKE AND CLUTCH MECHANISM.

1,227,758.     Specification of Letters Patent.      Patented May 29, 1917.

Application filed May 19, 1916. Serial No. 98,649.

*To all whom it may concern:*

Be it known that I, FORREST ELLIOTT DAVIS, a citizen of the United States, residing at Whitingham, in the county of Windham, State of Vermont, have invented certain new and useful Improvements in Brake and Clutch Mechanism; and I do hereby declare the following to be a full, clear, and exact description of the invention, such as will enable others skilled in the art to which it appertains to make and use the same.

This invention relates to automobiles and has special reference to an attachment for the motor mechanism of vehicles of this description, the attachment being designed to operate the clutch and brake of an automobile by means of air or other fluid pressure.

The principal object of the invention is to provide an improved and simplified device by means of which the operator of the automobile will be enabled to effectively release the clutch and then set the brakes by the simple movement of a finger lever located on the steering post of the machine.

Another object of the invention is to provide a simplified air brake mechanism which will also operate to release the clutch of the motor mechanism, the clutch release being obtained prior to the setting of the brakes.

A third important object of the invention is to provide means for first releasing the clutch and then applying the brakes on an automobile which will not interfere with the manual release of the clutch.

With the above and other objects in view, as will be hereinafter apparent the invention consists in general of certain novel details of construction and combinations of parts hereinafter fully described, illustrated in the accompanying drawing, and specifically claimed.

In the accompanying drawing, like characters of reference indicate like parts in the several views, and:—

Figure 1 is a plan view of an automobile chassis constructed and equipped in accordance with this invention;

Fig. 2 is a longitudinal section through such a chassis showing the attachment in place thereon;

Fig. 3 is an enlarged detail view partly in section showing the steering post and parts adjacent thereto when equipped with the improved attachment;

Fig. 4 is an enlarged detail view showing the clutch and the connection of the clutch operating rod thereto as preferably used in the invention;

Fig. 5 is a detail section through the valve used for controlling the passage of air to the air brake cylinder;

Fig. 6 is a detail section through the air brake cylinder and disclosing the adjacent parts.

In the embodiment of the invention herein disclosed the frame of the chassis is indicated at 10 and supported on this frame is the usual engine having the shaft 12.

Mounted on the frame 10 is a pump 13 which is connected to the shaft 12 in any suitable manner, as by the connecting rod 14. This pump may be of any preferred construction as desired. Leading from this pump is a pipe 15 which connects with an air tank 16 supported from the chassis frame 10 and in the pipe 15 is a check valve 17. The air tank or reservoir 16 is provided with a safety valve 18 for the purpose of relieving excess pressure in said reservoir.

At 19 is disclosed one of the brake drums of the vehicle and this brake drum is surrounded by the usual brake band 20 which is connected by a brake rod 21 to one end of a brake lever 22 pivoted intermediate its ends as at 23.

The other end of this brake rod 22 is connected by a rod 24 to the piston rod 25. This piston rod is carried by a piston 26 working in an air cylinder 27 which is connected to the tank or reservoir 16 by means of a pipe 28. At a convenient point in the length of the pipe 28 there is provided a three-way valve 29 having an escape port 30 on one side and this valve is controlled by an arm 31. Extending from the arm 31 is a connecting rod 32 which has its remaining end connected to a bell crank lever 33 carried by the steering post 34. At the upper end of this steering post is located the usual steering wheel 35 and adjacent this wheel there is pivoted a finger lever 36 which is connected by a rod 37 with the bell crank lever 33. By means of this finger lever 36 the linkage including the bell crank lever and connecting rods may be operated to move the arm 31 so that the valve may be opened to place the reservoir 16 in communication with the cylinder 27 or the valve may be turned to permit the escape of air from the cylinder 27 through the port 30 to the atmosphere. The valve may also be positioned to cut off all flow of air through the pipe 28.

For the purpose of illustration there has been here disclosed a clutch of the ordinary friction type provided with a member 38 carried by the fly wheel of the engine and having a second member 39 slidable into and out of frictional engagement with the member 38. For the purpose of sliding the member 39 out of engagement prior to the operation of the brake this member 39 is connected to a rod 40 which extends at its rear end to a suitable opening in the brake lever 22 and terminates rearwardly in a collar 41. Interposed between the collar 41 and the brake lever 22 is a coil compression spring 42. The clutch member 39 is also connected in the usual manner to the foot pedal 43.

Extending upward from the air line 15 is a tube 44 which communicates with an air gage 45 mounted on the dash of the automobile so that the pressure in the reservoir 16 may be observed by the operator of the machine.

In order to make clear the operation of the device, let it be supposed that the machine is running with the brakes released and the clutch thrown in. If the operator desires to stop the machine it is merely necessary to move the finger lever 36 into such position as to open communication through the pipe 28 between the reservoir 16 and cylinder 27. This will cause movement of the piston 26 and by this movement will effect movement of the lever 22. As the lever 22 moves the rod 40 is pulled upon and moves the member 39 out of engagement with the clutch member 38. The brake is so arranged that during this unclutching movement the brake is not set, thus when the unclutching movement stops and the member 39 can move no farther the continued movement of the piston 36 effects setting of the brakes. This continued movement is permitted without further movement of the member 39 by reason of the fact that the spring 42 will be compressed through the slipping of the rod 40 through the lever 22.

To release the brake and clutch it is only necessary to operate the single lever 36 to move the valve 29 into such position that communication is established from the cylinder 27 through the pipe 28 to the air port 30 so that the compressed air can escape through this port, the piston being returned to its normal position by means of a spring 46 in the cylinder 27. During this movement it will be noted that the rod 40 can slip through the lever 22 so that the clutch can then be thrown in by manual operation. It will also be observed that the clutch member 39 can be moved independently of the brake mechanism because the rod 40 can slip through the rod 22.

There has thus been provided a simple and efficient device of the kind described and for the purpose specified.

It is obvious that many minor changes may be made in the form and construction of the invention without departing from the material principles thereof. It is not therefore desired to confine the invention to the exact form herein shown and described, but it is wished to include all such as properly come within the scope claimed.

What is claimed is:—

1. The combination with a motor mechanism including a clutch and a brake; of a fluid pressure brake cylinder and piston and rod therefor, a brake lever connected to the rod and brake, a clutch releasing rod connected to the clutch and having an end extending slidably through the lever and a compression spring mounted upon the projecting end of the rod and yieldably connecting the rod and lever.

2. The combination with a motor mechanism including a clutch and a brake; of a fluid pressure brake cylinder and piston and rod therefor, a brake lever connected to the rod and brake, a clutch releasing rod connected to the clutch and having an end extending slidably through the lever, a compression spring mounted upon the projecting end of the rod and yieldably connecting the rod and lever, and means for effecting release movement of the clutch independently of the brake lever.

3. The combination with a motor mechanism including a clutch and a brake; of a fluid pressure brake cylinder and piston and rod therefor, a brake lever connected to the rod and brake, a clutch releasing rod connected to the clutch and having an end extending slidably through the lever, a fluid pressure reservoir, a valve controlled connection between the reservoir and cylinder, a finger lever adjacent the hand of the operator, and a linkage connecting the valve and finger lever.

4. The combination with a motor mechanism including a clutch and a brake; of a fluid pressure brake cylinder and piston and rod therefor, a brake lever connected to the rod and brake, a clutch releasing rod connected to the clutch and having an end extending slidably through the lever, a compression spring mounted upon the projecting end of the rod and yieldably connecting the rod and lever, a fluid pressure reservoir, a valve controlled connection between the reservoir and cylinder, a finger lever adjacent the hand of the operator, and a linkage connecting the valve and finger lever.

In testimony whereof, I affix my signature, in the presence of two witnesses.

FORREST ELLIOTT DAVIS.

Witnesses:
C. A. FAULKNER,
ANTONIO VALENTI.